Patented June 16, 1953

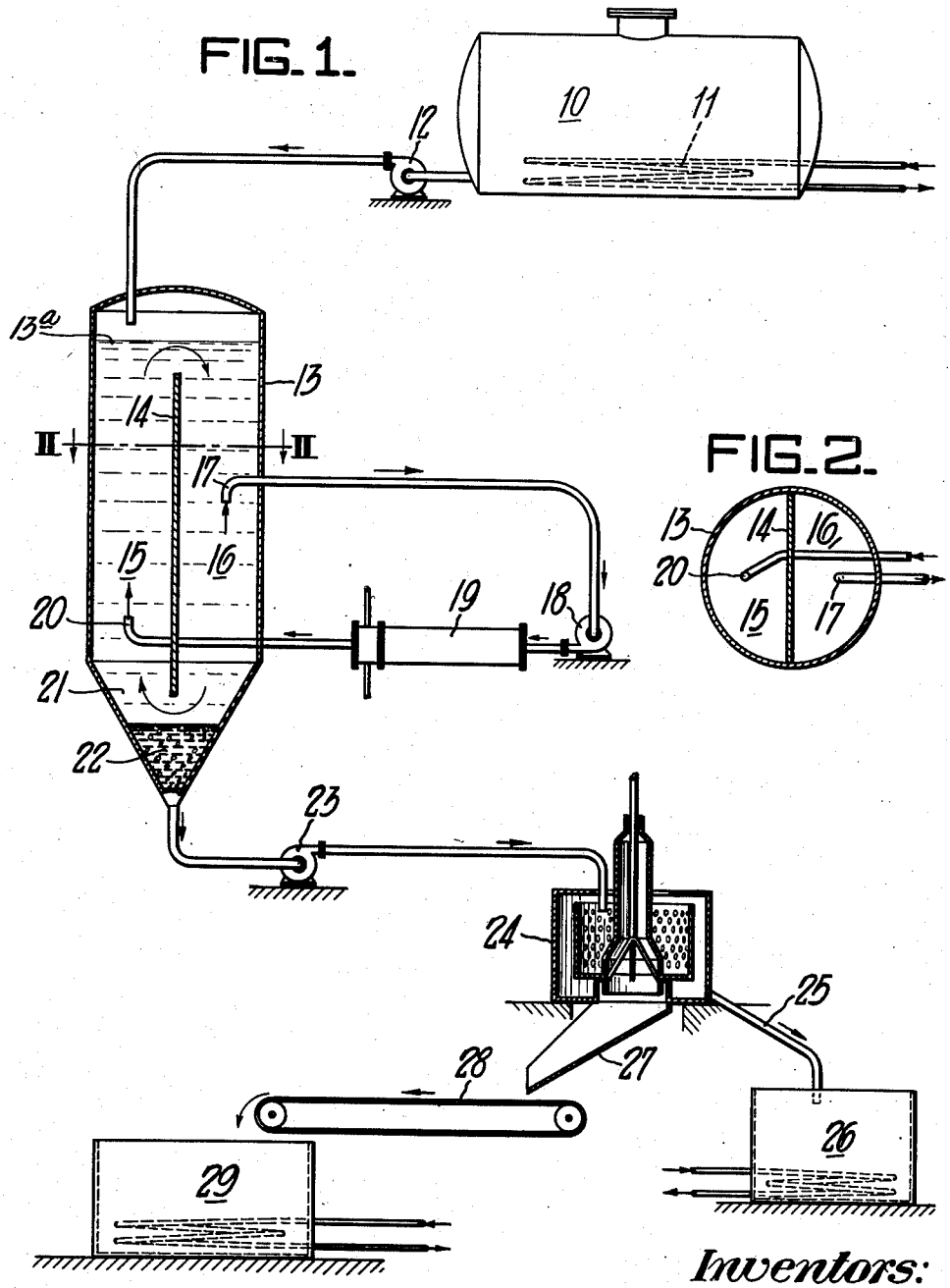

2,642,465

UNITED STATES PATENT OFFICE 2,642,465

METHOD AND APPARATUS FOR CRYSTALLIZING NAPHTHALENE

George J. Haddad and Joseph H. Wells, Pittsburgh, Pa., assignors to United States Steel Corporation, a corporation of New Jersey Application January 5, 1949, Serial No. 69,368

2 Claims. (Cl. 260—674)

1

This invention relates to the treatment of tar fractions or other liquids containing dissolved naphthalene, in order to recover the solute in a high state of purity.

In order to produce naphthalene of high purity, i. e., 90% or better, from a tar distillate fraction, for example, it is necessary to cause the naphthalene to form large crystals in order to facilitate mechanical separation thereof from the tar fraction in which it is originally dissolved. Although this problem has been the object of considerable attention for many years, no satisfactory procedure has been devised. In many plants, naphthalene-rich fractions hot from the still are delivered to tanks and cooled therein by atmospheric convection. The resultant cooling is slow because naphthalene first crystallizes on the tank walls forming an insulating layer. The crystals, furthermore, are plate-like and tend to form aggregates which trap tar oil so effectively that removal by filtering or centrifuging, even with a water wash, is always incomplete, resulting in naphthalene with a crystallizing point of from 70° to 73° C. instead of the desired 75° to 77° C.

To increase the cooling rate, water-jacketed tanks have been constructed and provided with scrapers to remove crystals as they form on the tank walls. Such provisions result in the formation of crystals of various sizes with the smaller sizes preponderating because of rapid cooling at the tank walls. These crystals have poor filterability because they mat together and trap the oil. In addition, they present a large surface area for adherence of oil. The net effect is to reduce the crystallizing point of the naphthalene recovered to a value between 68° and 72° C.

We have invented a novel apparatus and method for crystallizing naphthalene from solution in tar oil which overcome the aforementioned objections and produce uniform large crystals without requiring excessive floor space. In a preferred embodiment and practice, we provide a crystallizing tank having a vertical baffle terminating above the bottom and below the top of the tank, and cause circulation of the solution around the baffle and through a cooler external to the tank. This results in progressive crystallization, the size of the crystals depending on the rate of circulation and degree of cooling. The crystals when collected, drawn off and centrifuged or filtered, have a crystallizing temperature of 75° to 77° C.

A complete understanding of the invention may be obtained from the following detailed description and explanation which refer to the accompanying drawings. In the drawings, Figure 1 is a diagrammatic illustration of the apparatus we have devised for carrying out our method, parts being shown in elevation and parts in section; and Figure 2 is a section through the crystallizing tank taken along line II—II of Figure 1.

Referring in detail to the drawings, a tank 10 is adapted to receive a fraction of tar oil containing naphthalene in solution. The tank is preferably provided with heating means such as a steam coil 11. Oil at a temperature sufficient to cause solution of all the naphthalene present is transferred by a pump 12 from the tank 10 to a crystallizing tank 13 through suitable pipe connections. The tank 13 is provided with a transverse baffle or partition wall 14 terminating below the top of the tank and above the bottom, whereby circulation around the baffle, over the top and under the bottom thereof is permitted. The baffle divides the tank 13 into zones 15 and 16. The supply pipe from tank 10 enters tank 13 in off-center relation thereto and preferably above the zone 15 and tank 13 is normally kept filled with tar oil from tank 10 up to a level above the top of baffle 14, as indicated at 13ª.

A portion of the oil in the tank 13 is continuously drawn off through an outlet 17 located intermediate the top and bottom of the baffle 14 and delivered by a pump 18 through pipe connections to a surface cooler 19 of known construction external to the tank. As shown in the drawing, the outlet 17 is located in the zone 16 and has an elbow directed downwardly at its entrance end. Oil diverted from the tank to the cooler 19 is returned through an inlet 20 located in the lower portion of the zone 15. The inlet 20 has an elbow at its end directed upwardly to aid continuous circulation of the oil in the tank 13, upwardly through the zone 15 and downwardly through the zone 16.

The temperature of the oil in the tank increases from the bottom where the cooled oil is returned, to the top where the hot oil from the tank 10 is delivered. As a result of this temperature variation and the continuous circulation of oil, the zone 15 serves as a classification and growing zone and the zone 16 as a crystal-growth zone with some classification. Hot oil delivered to the top of the tank 13 descends through the zone 16 and is cooled somewhat as it descends. Some crystallization results and, because of the reversal of flow of the oil entering outlet 17, the larger crystals settle and only the smaller ones actually enter the outlet. The portion of the oil in the zone 16 which is continuously withdrawn and passed through the cooler 19 has its temperature reduced thereby, with the result that naphthalene crystals are formed and any crystals previously existing are increased in size. As the crystals and cooled oil are returned to the bottom of zone 15 from inlet 20, the larger crystals tend to sink by gravity against the upward flow of the oil and descend through the oil in the base 21 of the tank. The smaller crystals are carried upwardly with the ascending oil.

As the oil ascends toward the region of maximum temperature, the smaller crystals are redissolved to some extent. Such crystals as remain undissolved, however, grow by accretion as they pass upwardly through zone 15 and downwardly through the zone 16. This growth is promoted by the cooling resulting from passage through the cooler 19 and some of the crystals, as previously stated, are large enough on being discharged from the inlet 20 to sink to the bottom of the tank. There is thus a continuous recirculation or recycling of the oil accompanied by the removal of a portion of its naphthalene content in the form of large crystals which accumulate as a slurry in the base 21 of the tank 13, as indicated at 22. The crystal slurry 22 is discharged periodically from the base 21 by a pump 23 to a centrifuge 24. Successive batches of slurry are subjected to rotation in the basket of the centrifuge causing separation of the adherent oil which flows through a drain 25 to an oil-storage tank 26. After a batch of slurry has been thus treated, the discharge gate of the centrifuge basket is opened permitting the naphthalene crystals to fall through a chute 27, which delivers onto a traveling conveyor 28. The conveyor discharges the crystals into a naphthalene storage tank 29.

The circulation of oil from the zone 16 of the tank 13 through the cooler 19 and back to the zone 15 is regulated to maintain the desired temperature at the bottom of the tank 13. This temperature and the rate of flow maintained from the tank to the cooler and back again determine the size of the crystals accumulating in the slurry 22 and permit a control of the crystal size within wide limits. It will be observed that the processing apparatus described effects alternate heating and cooling of the oil with a classification of the naphthalene crystals formed during the cooling stage. The outlet 17 from the tank to the cooler is located below the top of the transverse baffle and above the inlet 20 which is above the bottom of the baffle. The baffle, with the described locations of the outlet and inlet, prevents direct flow from the inlet 20 to the outlet 17 and maintains the proper circulation upwardly through the zone 15 and downwardly through zone 16, thus permitting crystal growth to occur in the zone 16. Since the hot oil from the tank 10 is delivered to the top of the tank 13, which is at the maximum temperature, there is a minimum of "shock" crystallization. The off-center location of the supply pipe above zone 15 affords increased opportunity for the solution of nuclei crystals.

The relatively large crystals produced by the continuous classification, partial-solution and crystal-growth stages of the treatment may easily be separated from the oil trapped therewith in the slurry at the bottom of the tank by centrifuging, as described, or by filtering. After such separation, the naphthalene exhibits a crystallizing temperature from 75° to 77° C. corresponding to a purity of 90% or better.

In addition to the advantages already enumerated, the invention provides apparatus and procedure for obtaining naphthalene in large crystals at a good rate of productivity from apparatus which is simple, compact and easy to control.

Although we have illustrated and described but a preferred embodiment and practice of our invention, it will be understood that changes in the construction and procedure disclosed may be made without departing from the spirit of the invention or the scope of the appended claims.

We claim:

1. Apparatus for producing high-purity naphthalene crystals from a solution thereof comprising a tank adapted to hold a quantity of said solution, a substantially vertical partition extending across said tank and terminating short of the bottom and top thereof whereby circulation may occur upwardly on one side of said partition and downwardly on the other, an inlet entering the tank on said one side of said partition adjacent the top thereof, a cooler external to said tank, an outlet pipe extending from the tank on the other side of said partition and connected to said cooler, and a return connection from the cooler communicating with said tank on said one side of the partition, the entrance of said outlet pipe being a downwardly turned elbow, said return connection terminating above the bottom of said partition and having an upwardly turned elbow at its end, said outlet terminating at a level higher than said return connection but below the top of the partition.

2. In a method of producing naphthalene crystals, the steps including maintaining a pool of liquid containing dissolved naphthalene on both sides of a substantially vertical partition dividing the pool except at the top and bottom thereof, withdrawing liquid upwardly from one side of the pool about midway of the depth thereof, cooling the withdrawn liquid and returning the cooled liquid upwardly to the other side of the pool at a point below the level at which liquid is withdrawn, thereby maintaining circulation downwardly on said one side and upwardly on the other side, adding fresh solution to the pool adjacent the top thereof on said other side and collecting the crystals formed in the liquid, by gravity settling to the bottom of the pool.

GEORGE J. HADDAD.
JOSEPH H. WELLS.

References Cited in the file of this patent

UNITED STATES PATENTS

| Number | Name | Date |
|---|---|---|
| 2,035,441 | Allen | Mar. 31, 1936 |
| 2,042,661 | Jeremiassen | June 2, 1936 |
| 2,288,667 | Allen et al. | July 7, 1942 |
| 2,318,463 | Bussman | May 4, 1943 |
| 2,321,117 | Wilcock | June 8, 1943 |
| 2,403,127 | Schulze | July 2, 1946 |

OTHER REFERENCES

"Chemical Engineers' Handbook," John H. Perry, Editor, 2nd ed. McGraw-Hill Book Company, Inc., New York and London, 1941, pp. 1792-93.